(12) United States Patent
Lu

(10) Patent No.: US 8,348,065 B2
(45) Date of Patent: Jan. 8, 2013

(54) SEPARATION APPARATUS FOR SEPARATING MUD FROM WATER

(76) Inventor: Shun-Tsung Lu, Wufong Hsiang (TW)

( * ) Notice: Subject to any disclaimer, the term of this patent is extended or adjusted under 35 U.S.C. 154(b) by 245 days.

(21) Appl. No.: 12/858,476

(22) Filed: Aug. 18, 2010

(65) Prior Publication Data

US 2012/0043265 A1 Feb. 23, 2012

(51) Int. Cl.
*B04C 9/00* (2006.01)
(52) U.S. Cl. ........ 210/512.2; 210/151; 210/512.1; 210/252; 210/259; 209/12.1; 209/727; 209/728; 159/4.01; 34/371
(58) Field of Classification Search ........... 210/151, 210/512.1, 252, 259, 512.2; 209/12.1, 727, 209/788; 159/4.01; 34/371
See application file for complete search history.

(56) References Cited

U.S. PATENT DOCUMENTS 2,698,815 A * 1/1955 Bishop .......... 159/4.01

* cited by examiner

*Primary Examiner* — David A Reifsnyder
(74) *Attorney, Agent, or Firm* — Alan Kamrath; Kamrath IP Lawfirm, P.A.

(57) ABSTRACT

A separation apparatus for separating mud from water has an input tank device, a pipe device and a first separating assembly. The input tank device has an input tank. The pipe device has a first pipe having a first end and a second end. The first end of the first pipe is connected securely to the input tank. The first separating assembly has a main structure having a hydrocyclone. The hydrocyclone is connected to the second end of the first pipe. Accordingly, the hydrocyclone can efficiently and quickly separate mud from liquid of the raw water in the input tank.

8 Claims, 2 Drawing Sheets

SEPARATION APPARATUS FOR SEPARATING MUD FROM WATER

BACKGROUND OF THE INVENTION

1. Field of the Invention

The present invention relates to a separation apparatus for separating mud from water and, more particularly, to a separation apparatus for separating mud from water which can efficiently and quickly separate mud from liquid in raw water.

2. Description of Related Art

Because vegetation and forest on the over-developed slopes have been nearly destroyed in recent years, rainwater cannot be retained by the land and flows quickly into a reservoir or the sea. The turbidity of the raw water in the reservoir is increasing, because of the frequent and heavy rain caused by global warming Accordingly, purifying the turbid raw water is getting difficult.

Conventional apparatuses for purification of raw water include screens, polymers or films. However, frequently cleaning screens is not convenient. Using polymers to separate mud from liquid in raw water wastes time, because the mud needs a long time to deposit. The films are expendables and need frequent replacement. Therefore, how to efficiently and quickly separate the mud from the liquid in raw water is an important issue.

To overcome the shortcomings, the present invention provides a separation apparatus for separating mud from water to mitigate the aforementioned problems.

SUMMARY OF THE INVENTION

The main objective of the invention is to provide a separation apparatus for separating mud from water which can efficiently and quickly separate the mud from the liquid in raw water.

A separation apparatus for separating mud from water has an input tank device, a pipe device and a first separating assembly. The input tank device has an input tank. The pipe device has a first pipe having a first end and a second end. The first end of the first pipe is connected securely to the input tank. The first separating assembly has a main structure having a hydrocyclone. The hydrocyclone is connected to the second end of the first pipe. Accordingly, the hydrocyclone can efficiently and quickly separate mud from liquid of raw water in the input tank.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
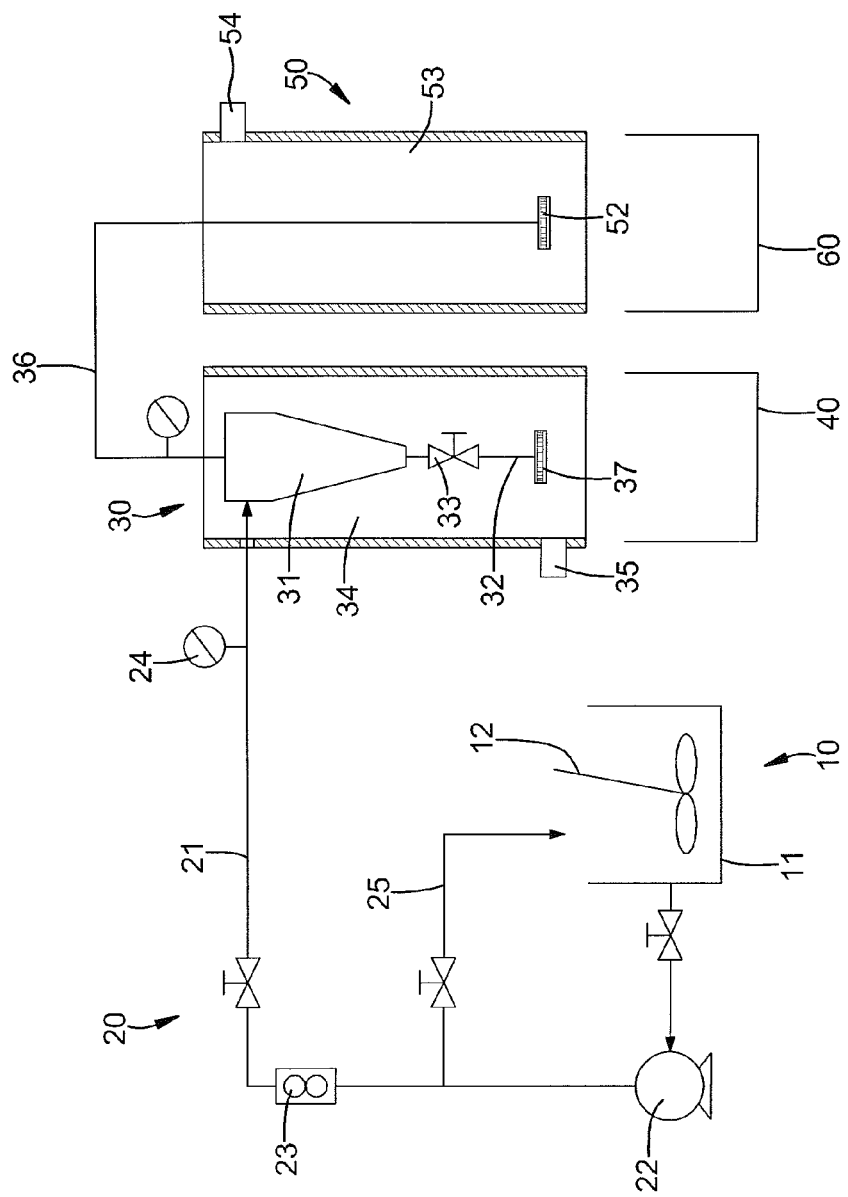
FIG. 1 is a block diagram of a first embodiment of a separation apparatus for separating mud from water in accordance with the present invention.

With reference to FIG. 1, a first embodiment of a separation apparatus for separating mud from water in accordance with the present invention comprises an input tank device 10, a pipe device 20 and a first separating assembly.

The input tank device 10 has an input tank 11 and a stirring device 12. The input tank 11 is capable of containing raw water. The raw water has liquid and mud. The stirring device 12 is mounted in the input tank 11 to stir the raw water.

The pipe device 20 is connected with the input tank device 10 and has a first pipe 21, a pump 22, a flow meter 23, a manometer 24 and a branch 25. The first pipe 21 has a first end and a second end. The first end of the first pipe 21 is connected securely to the input tank 11.

The pump 22, the flow meter 23 and the manometer 24 are connected with the first pipe 21 and are in sequence located at positions between the input tank 11 and the second end of the first pipe 21. The pump 22 is located at a position between the input tank 11 and the flow meter 23 and can pump the raw water in the input tank 11 into the first pipe 21.

The flow meter 23 can measure a flux of the raw water in the first pipe 21. The manometer 24 can measure pressure of the raw water in the first pipe 21. The branch 25 is connected with the first pipe 21 and has a first end and a second end. The first end of the branch 25 is connected to the first pipe 21 at a position between the pump 22 and the flow meter 23. The second end of the branch 25 is mounted above the input tank 11. Accordingly, part of the raw water in the first pipe 21 can be returned to the input tank 11 via the branch 25.

The first separating assembly is connected with the pipe device 20 and has a main structure 30, a collecting tank 40, a condensing device 50 and a liquid tank 60.

The main structure 30 is connected with the pipe device 20 and has a hydrocyclone 31, an exit tube 32, a valve 33, a drying housing 34, a drying nozzle 35, a connecting tube 36 and a first atomizer 37. The hydrocyclone 31 is connected to the second end of the first pipe 21. The hydrocyclone 31 is a device to separate the mud from the liquid. The hydrocyclone 31 is conical and has an overflow outlet and an underflow outlet. The underflow outlet of the hydrocyclone 31 is opposite to the overflow outlet of the hydrocyclone 31. The hydrocyclone 31 may be conventional, and detailed description is omitted.

The exit tube 32 has a first end and a second end. The first end of the exit tube 32 is connected to the underflow outlet of the hydrocyclone 31.

The valve 33 is connected with the exit tube 32 to control a flux of the mud in the exit tube 32.

The drying housing 34 surrounds the hydrocyclone 31, the exit tube 32 and the valve 33. The drying nozzle 35 is mounted securely in the drying housing 34 to jet air and quickly dry the mud separated from the raw water by the hydrocyclone 31. The connecting tube 36 has a first end and a second end. The first end of the connecting tube 36 is connected to the overflow outlet of the hydrocyclone 31.

The first atomizer 37 is connected to the second end of the exit tube 32 and can atomize the mud separated from the raw water by the hydrocyclone 31. Accordingly, to dry the atomized mud via the drying nozzle 35 is quick, easy and convenient. The first atomizer 37 may be conventional, and detailed description is omitted.

The collecting tank 40 is mounted below the first atomizer 37 to collect the dried mud.

The condensing device 50 is connected with the main structure 30 and has a second atomizer 52, a condensing housing 53 and a condensing nozzle 54. The second atomizer 52 is connected to the second end of the connecting tube 36 and can atomize the liquid separated from the raw water by the hydrocyclone 31. The second atomizer 52 may be conventional, and detailed description is omitted. To atomize the separated liquid can enhance an effect of separation from the liquid and the mud.

The condensing housing 53 surrounds the second atomizer 52. The condensing nozzle 54 is mounted securely in the condensing housing 53 to spray clean liquid. Drops of the liquid sprayed by the condensing nozzle 54 facilitate to quickly condense the atomized liquid jetted by the second atomizer 52.

The liquid tank 60 is mounted below the second atomizer 52 to collect the condensed liquid.

When the separation apparatus for separating mud from water in accordance with the present invention is in use, any raw water is collected and contained in the input tank 11 and is pumped to the hydrocyclone 31 by the pump 22 via the pipe device 20. When the raw water enters the hydrocyclone 31, a centrifugal force generated by the rotating hydrocyclone 31 separates the liquid and the mud of the raw water. The mud gathers in a bottom of the hydrocyclone 31, is dried by the drying nozzle 35, is atomized by the first atomizer 37 and is collected in the collecting tank 40 via the exit tube 32. Meanwhile, the separated liquid from the raw water is moved through the connecting tube 36, is atomized by the second atomizer 52, is condensed by the condensing nozzle 54 and is collected in the liquid tank 60. Consequently, the mud can be separated from the liquid.

Figure 2:
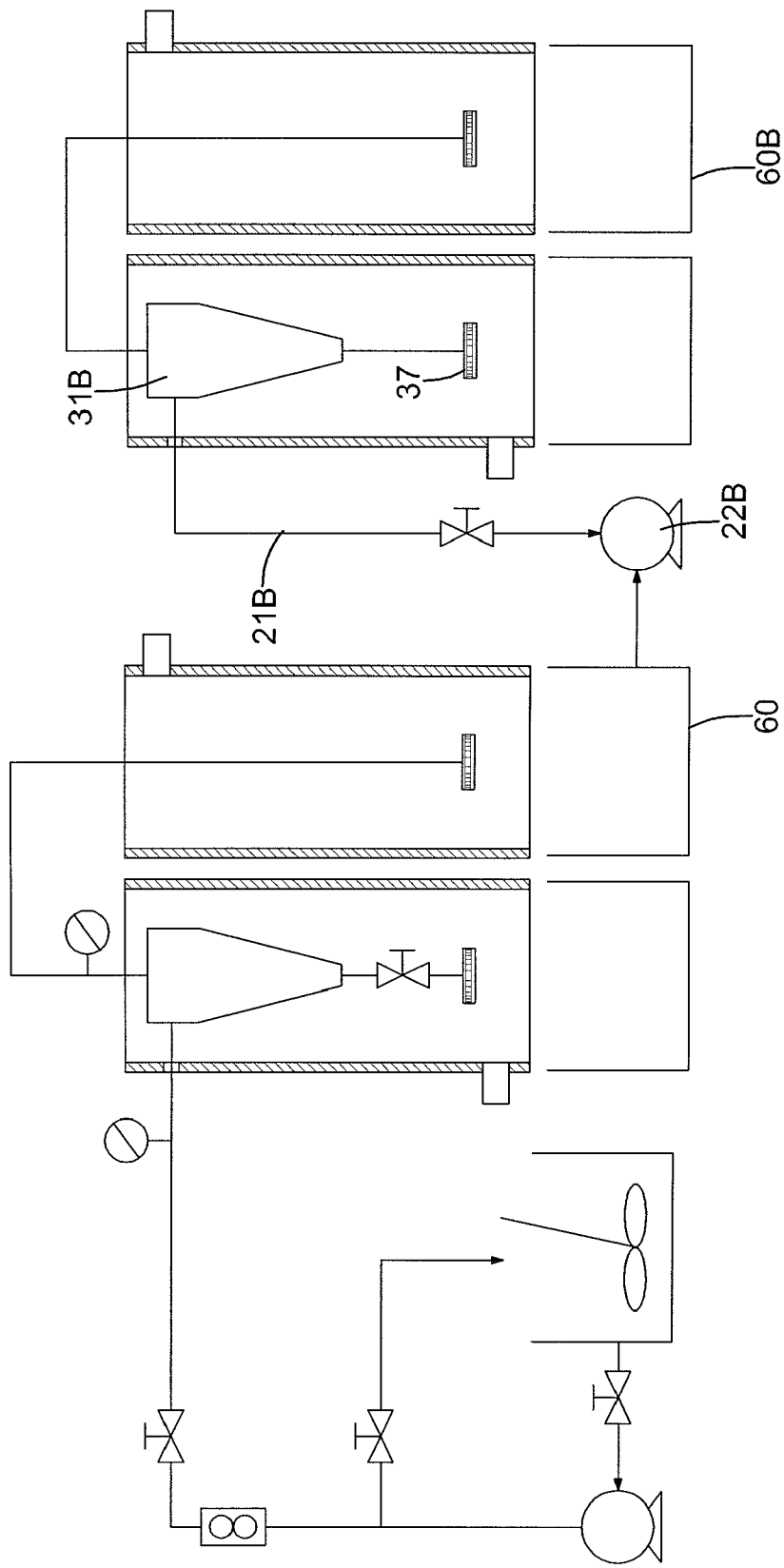
FIG. 2 is a block diagram of a second embodiment of the separation apparatus for separating mud from water in accordance with the present invention.

With reference to FIG. 2, a second embodiment of the separation apparatus for separating mud from water is substantially the same as the first embodiment of the separation apparatus for separating mud from water. The second embodiment of the hydrocyclone further has a second separating assembly, a second pipe 21B and a second pump 22B. A structure of the second separating assembly is the same as that of the first separating assembly of the first embodiment. The second separating assembly has a main structure, a collecting tank, a condensing device and a liquid tank 60B. The second pipe 2113 has two ends. The ends of the second pipe 21B are respectively connected to the liquid tank 60 of the first separating assembly and the hydrocyclone 31 B of the second separating assembly. The second pump 22B is connected with the second pipe 21B, such that the second separating assembly, the second pipe 21B and the second pump 22B are connected with the first separating assembly in a series way. Accordingly, the liquid tank 60 of the first separating assembly serves as an input tank of the second separating assembly. Because the liquid in the liquid tank 60 of the first separating assembly can be further separated by the second separating assembly, the liquid in the liquid tank 60B of the second separating assembly can be further purified, and an effect of separation from the liquid and the mud can be further enhanced.

From the above description, it is noted that the present invention has the following advantages:

1. Efficient and Quick Separation:

Because the hydrocyclone 31 can efficiently and quickly separate the mud from the liquid in the raw water, the mud and the liquid can be respectively moved into and collected in the collecting tank 40 and the liquid tank 60.

2. Quick Dryness of the Mud and Quick Condensation of the Atomized Liquid:

Because the drying nozzle 35 jets air to dry the mud, the mud can be dried quickly. The atomized liquid jetted by the second atomizer 52 can be condensed quickly with drops of the liquid sprayed by the condensing nozzle 54.

3. Enhanced Purity of the Liquid:

The second separating assembly, the second pipe 21B and the second pump 22B are connected with the first separating assembly in a series way. Because the liquid in the liquid tank 60 of the first separating assembly can be further separated by the second separating assembly, the liquid in the liquid tank 60B of the second separating assembly can be further purified, and an effect of separation from the liquid and the mud can be further enhanced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A separation apparatus for separating mud from water, the separation apparatus comprising:
    an input tank device having an input tank;
    a pipe device connected with the input tank device and having
        a first pipe having
            a first end connected securely to the input tank; and
            a second end;
        a pump connected with the first pipe at a position between the input tank and the second end of the first pipe; and
    a first separating assembly connected with the pipe device and having
        a main structure connected with the pipe device and having
            a hydrocyclone connected to the second end of the first pipe and having
                an overflow outlet; and
                an underflow outlet opposite to the overflow outlet of the hydrocyclone;
            an exit tube having
                a first end connected to the underflow outlet of the hydrocyclone; and
                a second end;
            a drying housing surrounding the hydrocyclone and the exit tube;
            a drying nozzle mounted securely in the drying housing;
            a connecting tube having a first end connected to the overflow outlet of the hydrocyclone; and
            a first atomizer connected to the second end of the exit tube; and
        a condensing device connected with the main structure and having
            a second atomizer connected to the second end of the connecting tube;
            a condensing housing surrounding the second atomizer; and
            a condensing nozzle mounted securely in the condensing housing.

2. The separation apparatus for separating mud from water as claimed in claim 1, wherein the first separating assembly has a collecting tank mounted below the first atomizer.

3. The separation apparatus for separating mud from water as claimed in claim 2, wherein the first separating assembly has a liquid tank mounted below the second atomizer.

4. The separation apparatus for separating mud from water as claimed in claim 3, further comprising
    a second separating assembly having a collecting tank, a condensing device, a liquid tank and a main structure having a hydrocyclone;

a second pipe having two ends respectively connected to the liquid tank of the first separating assembly and the hydrocyclone of the second separating assembly; and a second pump connected with the second pipe.

5. The separation apparatus for separating mud from water as claimed in claim 4, wherein the pipe device has a flow meter connected with the first pipe.

6. The separation apparatus for separating mud from water as claimed in claim 5, wherein the pipe device has a manometer connected with the first pipe.

7. The separation apparatus for separating mud from water as claimed in claim 6, wherein the input tank device has a stirring device mounted in the input tank.

8. The separation apparatus for separating mud from water as claimed in claim 7, wherein the main structure of the first separating assembly has a valve connected with the exit tube of the first separating assembly.

* * * * *